United States Patent
Hunt

(10) Patent No.: US 12,427,851 B2
(45) Date of Patent: Sep. 30, 2025

(54) VEHICLE WITH WHEEL-MOUNTED ENERGY STORAGE

(71) Applicant: CNH Industrial America LLC, New Holland, PA (US)

(72) Inventor: Cory Douglas Hunt, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 303 days.

(21) Appl. No.: 18/085,178

(22) Filed: Dec. 20, 2022

(65) Prior Publication Data

US 2024/0198784 A1    Jun. 20, 2024

(51) Int. Cl.
  *B60K 7/00*  (2006.01)
  *B60K 1/04*  (2019.01)

(52) U.S. Cl.
  CPC .... *B60K 7/0007* (2013.01); *B60K 2001/0405* (2013.01); *B60K 2007/0038* (2013.01)

(58) Field of Classification Search
  CPC ........... B60K 7/0007; B60K 2001/045; B60K 2001/0405
  See application file for complete search history.

(56) References Cited

U.S. PATENT DOCUMENTS

| | | |
|---|---|---|
| 4,311,985 A | 1/1982 | Gee et al. |
| 5,212,026 A | 5/1993 | Mitchell |
| 5,427,193 A | 6/1995 | Avakian |
| 5,474,150 A | 12/1995 | Mabuchi |
| 5,771,988 A | 6/1998 | Kikutani et al. |
| 6,390,216 B1 | 5/2002 | Sueshige et al. |
| 2003/0155163 A1 | 8/2003 | Sugata et al. |
| 2003/0228516 A1 | 12/2003 | McDermott |
| 2004/0089487 A1 | 5/2004 | Rowley et al. |
| 2005/0211357 A1 | 9/2005 | Ren |
| 2015/0108823 A1* | 4/2015 | Figuered ............ B60B 27/0068 301/6.5 |
| 2015/0266385 A1 | 9/2015 | Lang |
| 2017/0136864 A1 | 5/2017 | Ito et al. |
| 2017/0210217 A1 | 7/2017 | Kim et al. |
| 2017/0259663 A1* | 9/2017 | Chan .................. B60K 17/046 |
| 2018/0015823 A1* | 1/2018 | Wu ...................... B60K 7/0007 |
| 2019/0040921 A1* | 2/2019 | Zhao .................... B60T 1/065 |
| 2019/0140230 A1* | 5/2019 | Gu ........................... B60K 1/04 |

(Continued)

FOREIGN PATENT DOCUMENTS

| | | |
|---|---|---|
| EP | 2423094 B1 | 4/2014 |
| RU | 2180618 C2 | 3/2022 |

(Continued)

OTHER PUBLICATIONS

Extended European Search Report for EP Application No. 23218737.7 dated May 27, 2024 (13 pages).

*Primary Examiner* — Erez Gurari
(74) *Attorney, Agent, or Firm* — Foley & Lardner LLP

(57) ABSTRACT

A vehicle includes a chassis, a tractive assembly coupled to the chassis, the tractive assembly including a tractive element configured to engage a support surface, a battery directly coupled to the tractive assembly, and an electric motor coupled to the tractive assembly. The electric motor is configured to receive electrical energy from the battery and drive movement of the tractive assembly relative to the chassis to propel the vehicle.

17 Claims, 7 Drawing Sheets

(56) References Cited

U.S. PATENT DOCUMENTS

| | | | |
|---|---|---|---|
| 2019/0160937 A1* | 5/2019 | Yilma | B60K 7/0007 |
| 2019/0329809 A1* | 10/2019 | Mackay | B60K 17/043 |
| 2021/0044176 A1* | 2/2021 | Takamatsu | B62M 11/16 |
| 2021/0178893 A1* | 6/2021 | Yang | H02K 5/10 |
| 2022/0153333 A1 | 5/2022 | Holleis | |
| 2024/0198784 A1* | 6/2024 | Hunt | B60K 1/04 |

FOREIGN PATENT DOCUMENTS

| | | |
|---|---|---|
| WO | WO-2010/025502 A1 | 3/2010 |
| WO | 2016/128488 A1 | 8/2016 |

* cited by examiner

VEHICLE WITH WHEEL-MOUNTED ENERGY STORAGE

BACKGROUND

The present disclosure relates generally to vehicles. More specifically, the present disclosure relates to vehicles powered at least partially by electrical energy.

Some electric and hybrid vehicles are powered by batteries stored onboard the vehicle. Specifically, batteries are typically stored onboard a chassis of the vehicle. To maximize the energy storage capacity provided by these batteries, the batteries are often large and heavy. These batteries take up space on the chassis that might otherwise be used to house other components. Additionally, when the chassis is raised above the ground to increase the ground clearance of the vehicle, the batteries are also raised, which elevates the center of gravity of the vehicle and reduces vehicle stability.

SUMMARY

One embodiment relates to a vehicle. The vehicle includes a chassis, a tractive assembly coupled to the chassis, the tractive assembly including a tractive element configured to engage a support surface, a battery directly coupled to the tractive assembly, and an electric motor coupled to the tractive assembly. The electric motor is configured to receive electrical energy from the battery and drive movement of the tractive assembly relative to the chassis to propel the vehicle.

Another embodiment relates to a wheel assembly. The wheel assembly includes an interface configured to be coupled to a chassis of a vehicle, a wheel rotatably coupled to the interface, an electric motor coupled to the wheel and the interface and configured to rotate the wheel relative to the interface about an axis of rotation, and a battery removably coupled to the wheel and electrically coupled to the electric motor.

Still another embodiment relates to a vehicle. The vehicle includes a chassis, a first wheel assembly coupled to the chassis, a second wheel assembly coupled to the chassis, an operator interface coupled to the chassis, and a central controller operatively coupled to the operator interface. The first wheel assembly includes a first wheel, a first electric motor coupled to the first wheel and configured to drive rotation of the first wheel relative to the chassis, a first battery coupled to the first wheel and electrically coupled to the first electric motor, and a first wheel controller operatively coupled to the first electric motor. The second wheel assembly includes a second wheel, a second electric motor coupled to the second wheel and configured to drive rotation of the second wheel relative to the chassis, a second battery coupled to the second wheel and electrically coupled to the second electric motor, and a second wheel controller operatively coupled to the second electric motor. The central controller is in wireless communication with the first wheel controller and the second wheel controller. The central controller is configured to command the first wheel controller and the second wheel controller in response to the operator interface receiving an input requesting movement of the vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes one or more wheel assemblies coupled to a chassis. Each wheel assembly is self-powered and includes a series of batteries mounted directly on a wheel. An electric motor is coupled to the wheel and receives electrical energy from the batteries to drive rotation of the wheel relative to the chassis. Each wheel assembly may include a wheel controller in wireless communication with a central controller, permitting the wheel controllers to rotate with the wheels.

Overall Vehicle

Figure 1:
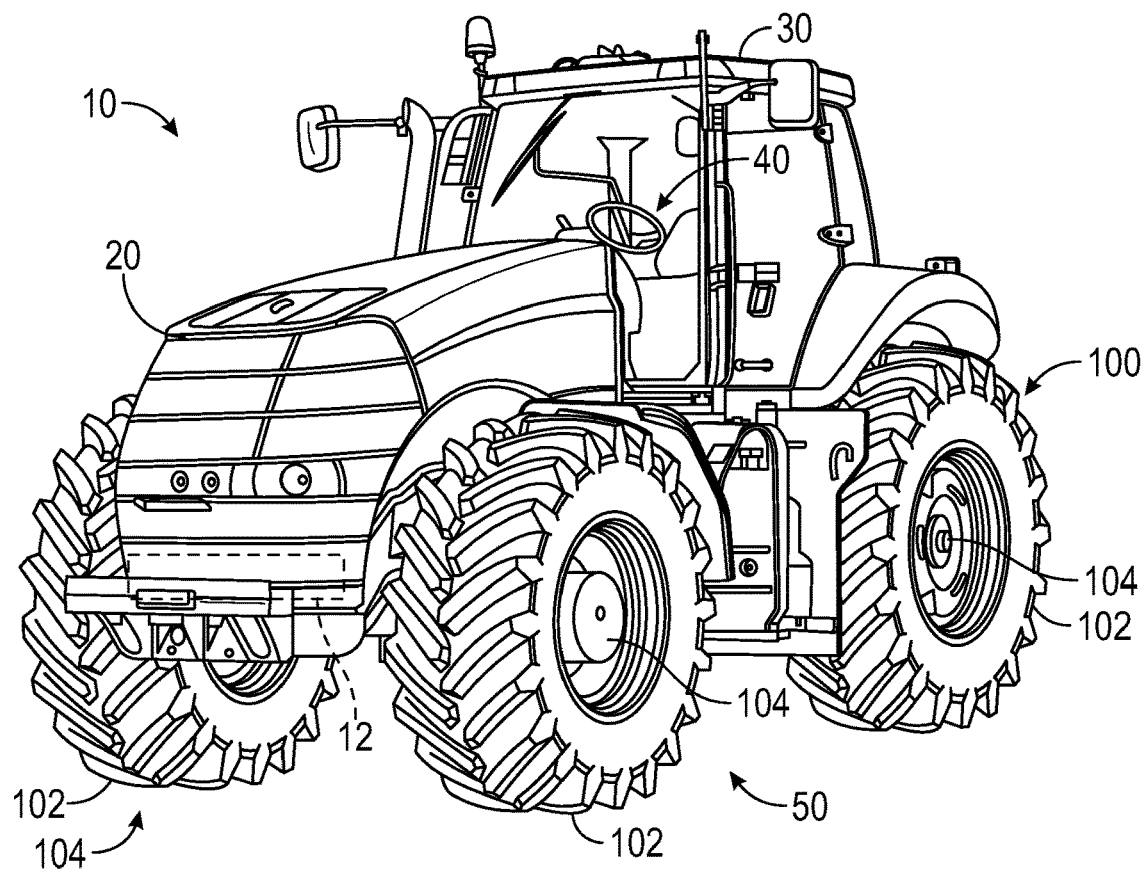
FIG. 1 is a perspective view of a vehicle, according to an exemplary embodiment.
Figure 2:
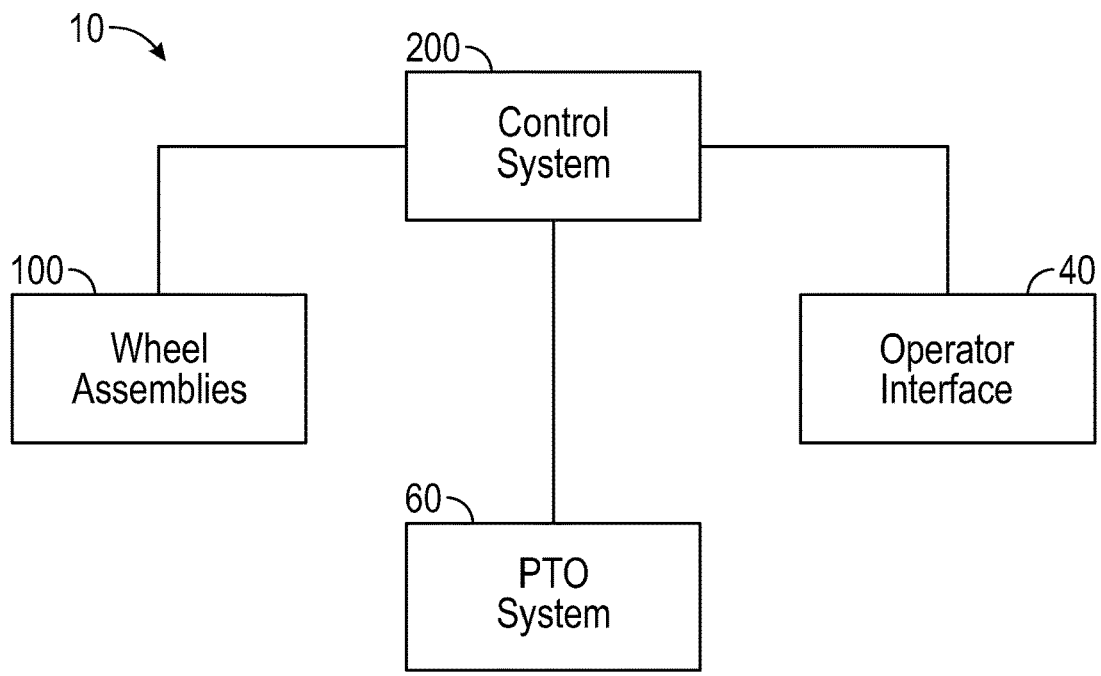
FIG. 2 is a schematic block diagram of the vehicle of FIG. 1, according to an exemplary embodiment.
Figure 3:
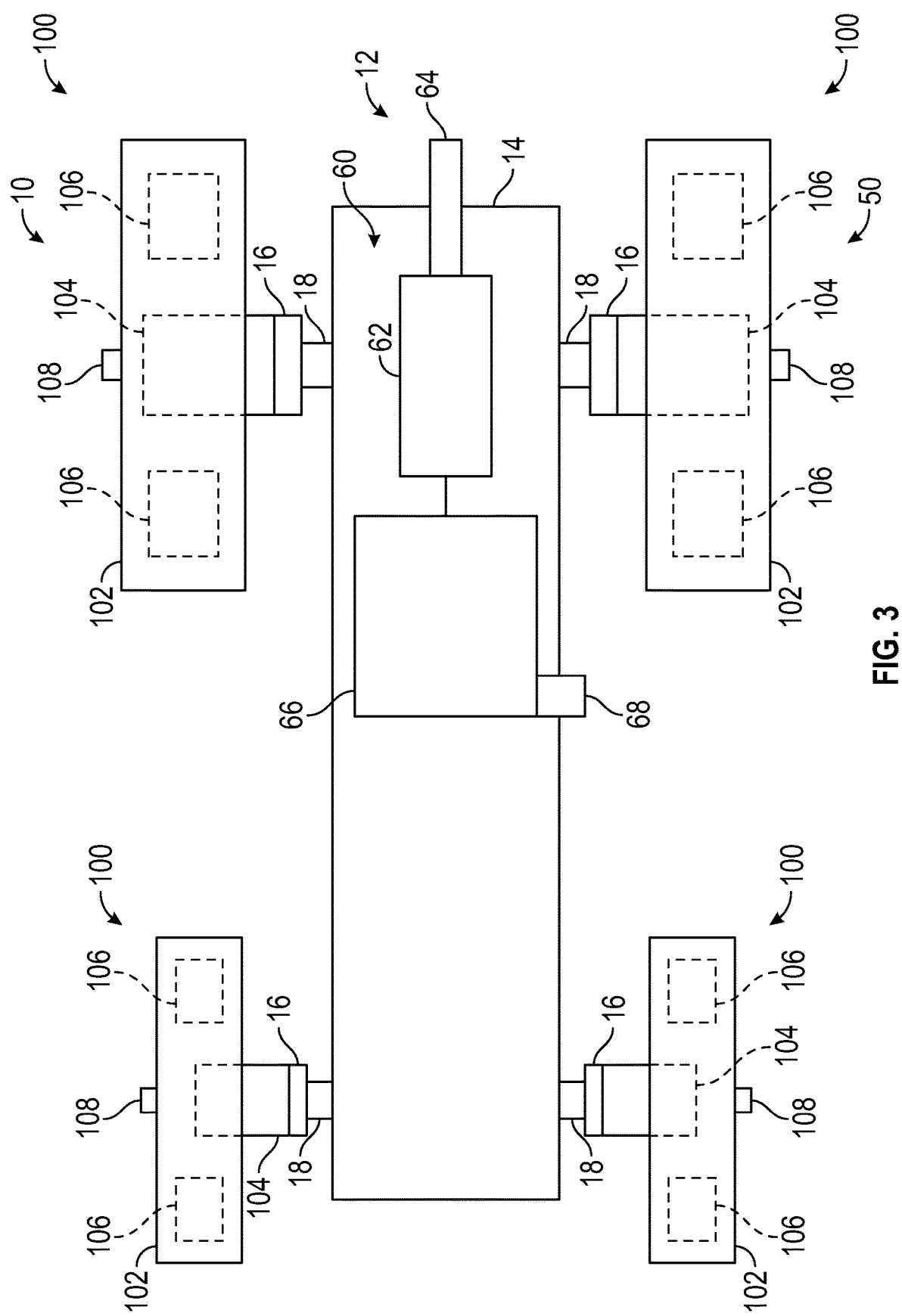
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis or frame assembly, shown as chassis 12; a body assembly, shown as body 20, coupled to the chassis 12 and having an occupant portion or section, shown as cab 30; operator input and output devices or a user interface, shown as operator interface 40, that are disposed within the cab 30; a drivetrain, shown as driveline 50, coupled to the chassis 12 and at least partially disposed under the body 20; a power take off (PTO) system coupled to the chassis 12 and configured and a vehicle control system, shown as control system 200, coupled to the operator interface 40 and the driveline 50. The driveline 50 includes a series of self-powered tractive assemblies, shown as wheel assemblies 100. In other embodiments, the vehicle 10 includes more or fewer components.

The chassis 12 of the vehicle 10 may include a structural frame (e.g., the chassis 12) formed from one or more frame members coupled to one another (e.g., as a weldment). Additionally or alternatively, the chassis may include a portion of the driveline 50. By way of example, a component of the driveline 50 (e.g., a transmission) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

Referring to FIG. 3, the chassis 12 includes a structural frame, shown as frame 14. The frame 14 extends longitudinally along the length of the vehicle 10. The frame 14 extends below and supports the cab 30. The chassis 12 further includes a series of connection points or interfaces, shown as wheel interfaces 16. Each wheel interface 16 provides a connection point to which the wheel assemblies 100 of the driveline 50 may be coupled. As shown, the chassis 12 includes four wheel interfaces 16: two near the front end of the frame 14, and two near the rear end of the frame 14. Two of the wheel interfaces 16 are positioned along the left side of the frame 14, and two of the wheel interfaces 16 are positioned on the right side of the frame 14.

Each of the wheel interfaces 16 is coupled to the frame 14 by a connector or intermediate portion, shown as connector 18. Each connector 18 extends between the frame 14 and one of the wheel interfaces 16, coupling the wheel interface 16 to the frame 14. In some embodiments, the connector 18 fixedly couples the wheel interface to the frame 14. In some embodiments, the connector 18 includes steering components (e.g., a steering knuckle, a tie rod, etc.) that facilitates rotation of the wheel interface 16 about a substantially vertical axis to permit steering the vehicle 10. In one exemplary embodiment, the rear two connectors 18 fixedly couple the corresponding wheel interfaces 16 to the frame 14, and the front two connectors 18 include steering components to facilitate steering the front two wheel interfaces 16. In some embodiments, the connector 18 includes suspension components (e.g., springs, dampers, shock absorbers, etc.) permit vertical movement of the wheel assemblies 100 to respond to changes in terrain. The suspension components may reduce movement of the chassis 10 as the wheel assemblies 100 encounter rough terrain. By way of example, a shock absorber may permit a wheel assembly 100 and the corresponding connector 18 to move upward in response to the wheel assembly 100 encountering a raised portion of the support surface.

In some embodiments, the connectors 18 hold the wheel interfaces 16 in place, preventing rotation of the wheel interfaces 16 about a horizontal axis. By holding the wheel interfaces 16 stationary, the wheel interfaces 16 provide a fixed connection to the frame 14, and the wheel assemblies 100 can apply a torque against the frame 14. In some such embodiments, the connectors 18 permanently prevent rotation of the wheel interfaces 16, such that the wheel interfaces 16 are incapable of rotation in all operating modes of the vehicle 10. In other embodiments, the connectors 18 selectively prevent rotation of the wheel interfaces 16. By way of example, the wheel interfaces 16 may each be rotatable about an axis of rotation, and the driveline 50 may include brakes or a transmission that selectively limits (e.g., prevents) rotation of the wheel interfaces 16.

The PTO system 60 provides a rotational mechanical energy output to facilitate driving an attached implement and/or a trailed implement of the vehicle 10. The PTO system 60 includes a driver, shown as electric motor 62. The electric motor 62 includes an output shaft or PTO shaft, shown as PTO 64, that the electric motor 62 drives to provide the rotational mechanical energy output. The PTO 64 may be configured to be selectively coupled to the attached implement or trailed implement. By way of example, the PTO 64 may have a keyway that is configured to engage a corresponding key of the implement to transfer the rotational mechanical energy.

The PTO system 60 further includes an energy storage device (e.g., one or more batteries or capacitors), shown as battery pack 66, that is configured to store energy and provide the stored energy to the electric motor 62 to power the electric motor 62. Specifically, the battery pack 66 provides electrical energy to the electric motor 62. The PTO system 60 further includes a charging interface, shown as electrical connector 68, that is configured to engage an external source of electrical energy (e.g., a generator, a power grid, a solar panel, etc.). The electrical connector 68 may transfer the electrical energy to the battery pack 66 to charge the battery pack 66. In other embodiments, the PTO system 60 utilizes a different type of driver (e.g., a hydraulic motor, a pneumatic motor, an internal combustion engine, etc.) to drive the PTO 64.

Wheel Assemblies

Referring to FIG. 3, the vehicle 10 includes a series of wheel assemblies 100, each coupled to one of the wheel interfaces 16. Each wheel assembly 100 includes a tractive portion or tractive assembly, shown as wheel 102. The wheel 102 engages a support surface (e.g., the ground) to support the vehicle 10. When rotated, the wheel 102 propels the vehicle 10. Each wheel 102 is rotatably coupled to the corresponding wheel interface 16. The front wheels 102 may be aligned with one another, and the rear wheels 102 may be aligned with one another.

Each wheel assembly 100 further includes a driver, shown as electric motor 104. The electric motor 104 is coupled to the corresponding wheel interface 16 and to the wheel 102. The electric motor 104 applies a torque between the wheel 102 and the wheel interface 16. Accordingly, when the wheel interface 16 is held stationary, the electric motor 104 drives rotation of the wheel 102 relative to the chassis 12. In some embodiments, the electric motor 104 includes a gearbox or power transmission (e.g., a planetary gear set) that controls the output speed of the electric motor 104.

Each wheel assembly 100 further includes one or more energy storage devices (e.g., one or more batteries or capacitors, etc.), shown as wheel batteries 106. The wheel batteries 106 are directly coupled to the wheel 102, such that the wheel batteries 106 are supported by the wheel 102. Accordingly, the wheel batteries 106 are indirectly coupled to the chassis 12 through the wheel 102. The wheel batteries 106 store energy (e.g., chemically) and deliver the stored energy to the electric motor 104 as electrical energy to power the electric motor 104. The wheel batteries 106 may be rechargeable. Each wheel battery 106 may include one or more battery cells within a common housing. The wheel batteries 106 may utilize any type of battery technology or battery chemistries, such as lithium-ion battery cells, lead-acid battery cells, etc.

Each wheel assembly 100 further includes a charging interface, shown as electrical connector 108, that is configured to engage an external source of electrical energy (e.g., a generator, a power grid, a solar panel, etc.). The electrical connector 108 may transfer the electrical energy to the wheel batteries 106 to charge the wheel batteries 106. The electrical connector 108 may utilize a physical connector that makes direct contact with a corresponding connector of the external source. Additionally or alternatively, the wheel assembly 100 may utilize a different type of charging interface, such as an induction coil for wireless charging. In some embodiments, the wheel batteries 106 are selectively coupled to the wheel 102, such that the wheel batteries 106 can be removed and charged externally or swapped with other, fully charged wheel batteries 106. In such embodiments, the electrical connector 108 may be omitted.

Figure 4:
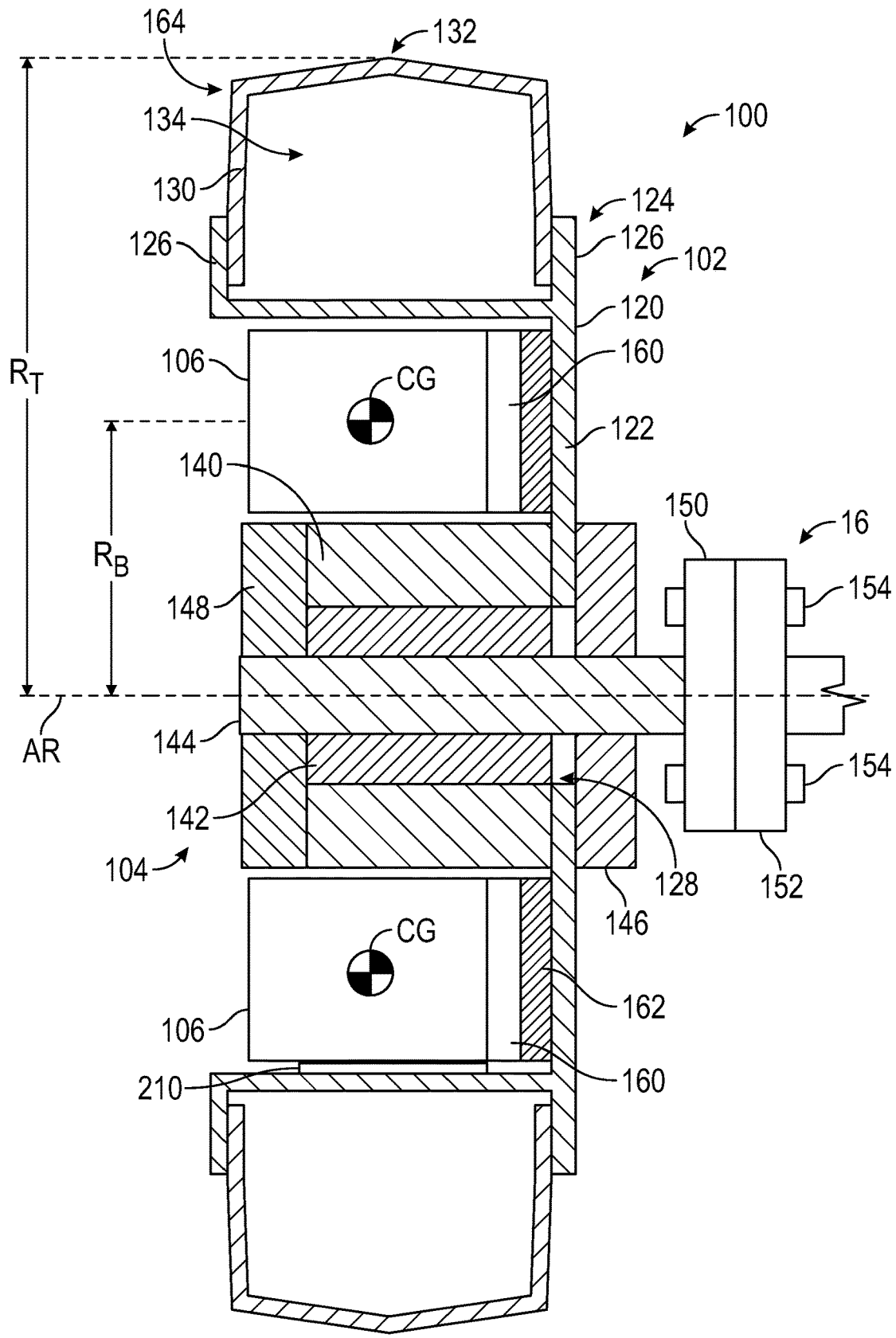
FIG. 4 is a front partial section view of a wheel assembly of the driveline of FIG. 3, according to an exemplary embodiment.

Referring to FIG. 4, a wheel assembly 100 is shown according to an exemplary embodiment. As shown, the wheel 102 is rotatable relative to the wheel interface 16 about an axis of rotation AR. The axis of rotation AR extends laterally and horizontally. The axis of rotation AR is substantially centered about the wheel assembly 100.

The wheel 102 includes a first portion, support portion, or frame, shown as rim 120, that supports other components of the wheel assembly 100. The rim 120 may be constructed from a substantially rigid material, such as steel or aluminum. The rim 120 includes a sidewall 122 that extends substantially perpendicular to the axis of rotation AR. The rim 120 further includes a coupling portion, shown as tire interface 124, that is coupled to an outer portion or circumference of the sidewall 122. The tire interface 124 is configured to removably couple a tractive element, such as a tire, to the rim 120. The tire interface 124 defines a circumference of the rim 120. The tire interface 124 includes a pair of mounting flanges, shown as rim flanges 126, extending radially outward, away from the axis of rotation AR. The rim flanges 126 are laterally offset from one another. In some embodiments, the wheel 102 includes a panel or cover that extends between the tire interfaces 124, defining an enclosed volume between the cover, the sidewall 122, and the tire interfaces 124. The cover may protect the components of the wheel assembly 100 from contact with debris. The cover may be removable to facilitate maintenance.

The sidewall 122 of the rim 120 defines a central aperture, shown as shaft aperture 128. The shaft aperture 128 extends laterally through the sidewall 122. The shaft aperture 128 is substantially centered about the axis of rotation AR.

The wheel 102 further includes a tractive element, shown as tire 130. The tire 130 is removably coupled to the tire interface 124. By way of example, the rim flanges 126 may engage the tire 130 to couple the tire 130 to the rim 120. The tire 130 defines an outer perimeter or circumference of the wheel 102, shown as tread 132. In some embodiments, the tread 132 is the outermost portion of the wheel 102. As shown in FIG. 4, the tread 132 defines the largest radius of the wheel, shown as tread radius $R_T$, measured from the axis of rotation AR. The outer diameter of the wheel 102 can be calculated by doubling the tread radius $R_T$. The tread 132 engages the support surface (e.g., the ground) below the wheel 102 to support the vehicle 10. The tread 132 may translate a torque on the wheel 102 into a longitudinal force to propel the vehicle 10. The tread 132 may be textured or patterned to minimize slippage between the support surface and the tread 132. The tire 130 may be constructed from a flexible material, such as rubber.

An enclosed volume, shown as tire volume 134, is defined between the tire 130 and the tire interface 124. The tire volume 134 may be fluidly sealed. In some embodiments, the tire volume 134 is filled with a pressurized gas (e.g., nitrogen, air, etc.). This pressurized gas may expand the tire 130. In some embodiments, the tire volume 134 is filled at least partially with a ballast fluid.

The electric motor 104 may be a direct current (DC) or alternating current (AC) motor. The electric motor 104 includes a first portion or rotating portion, shown as stator 140, and a second portion or stationary portion, shown as rotor 142. The stator 140 is electrically coupled to the wheel batteries 106 and configured to receive electrical energy from the wheel batteries 106. Upon receiving the electrical energy, the stator 140 generates a magnetic field that causes the rotor 142 to rotate relative to the stator 140. The stator 140 is fixedly coupled to the rim 120, and the rotor 142 is fixedly coupled to the wheel interface 16. Accordingly, when the stator 140 receives the electrical energy from the wheel batteries 106, the electric motor 104 generates a torque that causes rotation of the wheel 102 relative to the wheel interface 16.

The electric motor 104 further includes an output shaft, shown as motor shaft 144. The motor shaft 144 is fixedly coupled to the rotor 142, such that the motor shaft 144 rotates with the rotor 142. The rotor 142 and the motor shaft 144 are aligned with the axis of rotation AR, such that the electric motor 104 is also aligned with and centered about the axis of rotation AR. The motor shaft 144 extends long the axis of rotation AR, through the shaft aperture 128, and beyond the rim 120. The motor shaft 144 is received by a bushing or bearing assembly, shown as bearing block 146. The bearing block 146 is coupled to the rim 120 and engages the motor shaft 144. The bearing block 146 may support the motor shaft 144 while still permitting the motor shaft 144 to rotate relative to the rim 120.

The wheel assembly 100 further includes a brake assembly, shown as brake 148. The brake 148 selectively applies a frictional braking force that opposes rotation of the wheel 102 relative to the wheel interface 16. By way of example, the brake 148 may be a disc brake including a brake pad that selectively engages a disc to provide the braking force. As shown, the brake 148 is coupled to the stator 140 and the motor shaft 144. In other embodiments, the brake 148 is coupled to other components. In other embodiments, the brake 148 may be directly coupled to the chassis 12. By way of example, the brake 148 may include a hose or conduit that extends from the wheel assembly 100 to the chassis 12. The hose may facilitate supplying pressurized brake fluid from a container onboard the chassis 12 to the wheel assembly 100. Additionally or alternatively, the electric motor 104 may apply perform regenerative braking to charge the wheel batteries 106 and brake the wheel assembly 100.

The wheel assembly 100 further includes an interface, shown as flange 150, that is fixedly coupled to a distal end of the motor shaft 144. The flange 150 extends substantially perpendicular to the axis of rotation AR. The wheel interface 16 further includes a flange 152 that extends parallel to the flange 150. The flange 150 abuts the flange 152. A series of fasteners, shown as bolts 154, extend through the flanges 150 and 152, removably and fixedly coupling the flanges 150 and 152 to one another. The bolts 154 prevent rotation of the motor shaft 144 relative to the wheel interface 16, permitting the electric motor 104 to apply a torque against the wheel interface 16. A vertical load on the wheel 102 (e.g., from supporting the weight of the vehicle 10) is transferred through the rim 120, the bearing block 146, the motor shaft 144, the flange 150, and the bolts 154 to the wheel interface 16. To remove the wheel assembly 100 from the chassis 12 (e.g., for maintenance or updating the configuration of the vehicle 10), the bolts 154 are removed, and the flanges 150 and 152 are separated from one another.

Referring still to FIG. 4, the wheel batteries 106 are coupled to the rim 120 by a series of connectors or battery receptacles, shown as receptacles 160, and by a rotatable connector, bearing, or power transfer assembly, shown as slip ring 162. Each of the wheel batteries 106 are removably coupled to one of the receptacles 160. Each receptacle 160 may include one or more electrical contacts that electrically couple the receptacle 160 to a wheel battery 106 when the wheel battery 106 is engaged with the receptacle 160. The slip ring 162 electrically couples the receptacles 160 to the electric motor 104. By positioning the wheel batteries 106 on the wheel 102, the weight of the wheel batteries 106 may be positioned lower than the chassis 12. Accordingly, the wheel batteries 106 may serve as wheel ballast (e.g., in addition to ballast fluid within the tires 130). Advantageously, this may lower the center of gravity of the vehicle 10 relative to a vehicle in which batteries are mounted directly to a chassis.

In other embodiments, the slip ring 162 is omitted, and the receptacles 160 are directly coupled to the rim 120. The receptacles 160 may be electrically coupled to the electric motor 104 without the slip ring 162 (e.g., directly electrically coupled to the electric motor 104). It may be desirable to omit the slip ring 162 from the wheel assembly 100 to reduce the cost and complexity of the wheel assembly 100 and increase the durability of the wheel assembly 100. In such embodiments, the receptacles 160 may be fixedly coupled to the rim 120, such that the wheel batteries 106 are fixedly coupled to the wheel 102. Accordingly, the wheel batteries 106 may rotate with the wheel 102, and the effective rotational inertia of the wheel assembly 100 includes the wheel batteries 106 and the wheel 102.

The wheel batteries 106 are radially offset from the axis of rotation AR. As shown, the center of gravity CG of each wheel battery 106 is offset from the axis of rotation AR by a radial distance, shown as battery radius $R_B$. As shown, the wheel batteries 106 are positioned radially inward of the tire 130. The battery radius $R_B$ is less than the tread radius $R_T$, such that the wheel batteries 106 are received radially inward of the tread 132. Specifically, an enclosed volume or tractive element volume, shown as a wheel volume 164, is defined within the tread 132. The wheel batteries 106 and the electric motor 104 are positioned radially inward of the tread 132, such that the wheel volume 164 at least partially contains the wheel batteries 106 and the electric motor 104 (i.e., the wheel batteries 106 and the electric motor 104 extend at least partially within the wheel volume 164). Accordingly, the tread 132 acts as a barrier that prevents the wheel batteries 106 and the electric motor 104 from coming into contact with the support surface as the wheel 102 rotates.

The receptacles 160 removably couple the wheel batteries 106 to the wheel 102, permitting a modular arrangement of the wheel batteries 106. As shown, the receptacles 160 are positioned along an exterior side of the sidewall 122 of the rim 120, such that the wheel batteries 106 are accessible by an operator standing adjacent the wheel assembly 100 of the vehicle 10. An operator may add or remove wheel batteries 106 as desired. By way of example, the operator may remove depleted wheel batteries 106 and replace them with fully charged wheel batteries 106 (e.g., a different set of wheel batteries 106, the same wheel batteries 106 having been charged externally, etc.). By way of another example, the operator may remove a wheel battery 106 that is damaged and/or uses an older battery technology and replace that wheel battery 106 with a new wheel battery 106 that is in better condition and/or upgraded (e.g., more efficient, having a greater capacity, etc.). By way of another example, the operator may add or remove batteries to suit a desired application. In one example, each wheel assembly 100 may have four receptacles 160. If the vehicle 10 will be used in a long-range application (e.g., planting several fields, traveling between fields, etc.), the operator may populate all four receptacles 160 with wheel batteries 106. If the vehicle 10 will be used in a short-range application (e.g., planting a relatively small field or a small number of fields), the operator may populate only two of the receptacles 160 with wheel batteries, reducing the cost of the vehicle 10. Accordingly, the receptacles 160 permit a single wheel assembly 100 to be customized to suit multiple different applications.

In embodiments that include a slip ring 162, the slip ring 162 extends between the receptacles 160 and the sidewall 122 and couples the receptacles 160 to the sidewall 122. Specifically, the slip ring 162 rotatably couples the receptacles 160 to the sidewall 122 such that the wheel batteries 106 are rotatable relative to the rim 120 about the axis of rotation AR. The slip ring 162 further electrically couples the receptacles 160 to the electric motor 104. The slip ring 162 may maintain this electrical connection, regardless of whether the wheel batteries 106 rotate relative to the rim 120 (i.e., the slip ring 162 permits unlimited rotation of the wheel batteries 106 relative to the rim 120 without disrupting the electrical connection between the wheel batteries 106 and the electric motor 104).

In some embodiments, the mass of the wheel batteries 106 accounts for a significant portion of the overall mass of the wheel assembly 100. By permitting the wheel batteries 106 to rotate freely relative to the wheel 102, the slip ring 162 may reduce the effective rotational inertia of the wheel assembly 100. When the electric motor 104 is driven, the electric motor 104 applies a torque on the wheel 102 relative to the wheel interface 16, causing the wheel 102 to spin. If the wheel batteries 106 were fixedly coupled to the rim 120, such that the wheel batteries 106 were to rotate with the wheel 102, the rotational inertia of the wheel batteries 106 would resist an increase in rotational speed of the wheel 102 (e.g., when increasing the speed of the vehicle 10), increasing the load on the electric motor 104. Similarly, the rotational inertia of the wheel batteries 106 would resist a decrease in rotational speed of the wheel 102 (e.g., when braking the vehicle 10), increasing the load on the electric motor 104 and/or the brake 148. However, because the slip ring 162 permits the wheel batteries 106 to rotate relative to the wheel 102, the wheel batteries 106 can remain stationary and not contribute to the rotational inertia that is experienced by the electric motor 104. Accordingly, the slip ring 162 may contribute toward faster acceleration and deceleration of the vehicle 10.

In an alternative embodiment, the vehicle 10 uses another type of tractive assembly in place of the wheel assembly 100. By way of example, the tractive assembly may be a tracked assembly, and the tractive element may be a continuous track. The continuous track may define the tread 132 and may surround the other components of the wheel assembly 100.

Figure 5:
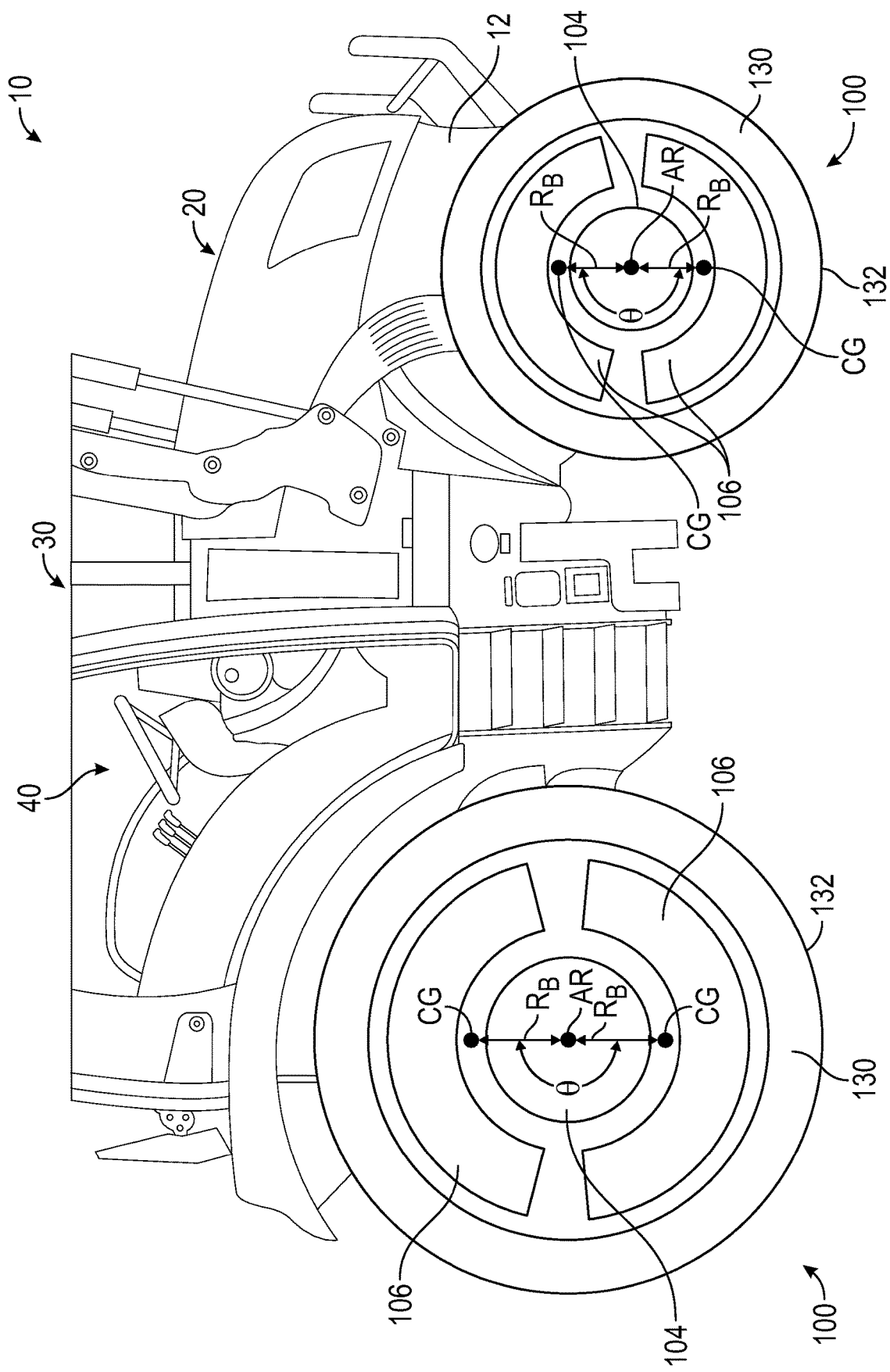
FIG. 5 is a right side view of the vehicle of FIG. 1 including four wheel assemblies, according to an exemplary embodiment.

Referring to FIG. 5, the vehicle 10 is shown configured with four wheel assemblies 100 according to an exemplary embodiment. In this embodiment, the vehicle 10 includes a first pair of wheel assemblies 100 at the front end of the chassis 12 and a second pair of wheel assemblies 100 at the rear end of the chassis 12. The wheel assemblies 100 at the front end of the chassis 12 are larger (e.g., have a larger outer diameter, are wider, etc.) than the wheel assemblies 100 at the rear end of the chassis 12. In some embodiments, the electric motors 104 at the front end of the chassis 12 are configured (e.g., outfitted with a gearbox, otherwise constructed, etc.) to operate at a faster speed than the electric motors 104 at the rear end of the chassis 12 to account for the differences in wheel diameter while maintaining the same surface speed (e.g., travel speed).

In the embodiment of FIG. 5, the wheel assemblies 100 each include two wheel batteries 106. As shown, the wheel batteries 106 have the same shape and size. The wheel batteries 106 may have similar densities, such that the wheel batteries 106 have the same weight and similarly-positioned centers of gravity CG. The wheel batteries 106 are arcuate to facilitate placement radially inward of the tire 130. In some embodiments, the radius of curvature of each wheel battery 106 is approximately centered about the axis of rotation AR. Due to the arcuate shape of the wheel batteries 106, the center of gravity CG of each wheel battery 106 may not be positioned within the wheel battery 106 (e.g., may be positioned outside of the wheel battery 106).

As shown, the wheel batteries 106 are angularly offset from one another about the axis of rotation AR. The battery radius $R_B$ of the first wheel battery 106 and the battery radius $R_B$ of the second wheel battery 106 are angularly offset from one another by an offset angle ⊖. As shown, the wheel batteries 106 are diametrically opposed from one another, such that the offset angle ⊖ is approximately 180 degrees. By placing the wheel batteries 106 opposite one another, overall center of gravity of all of the wheel batteries 106 is approximately centered about the axis of rotation AR. This placement minimizes vibration that would be caused by rotation of an eccentric center of gravity.

Figure 6:
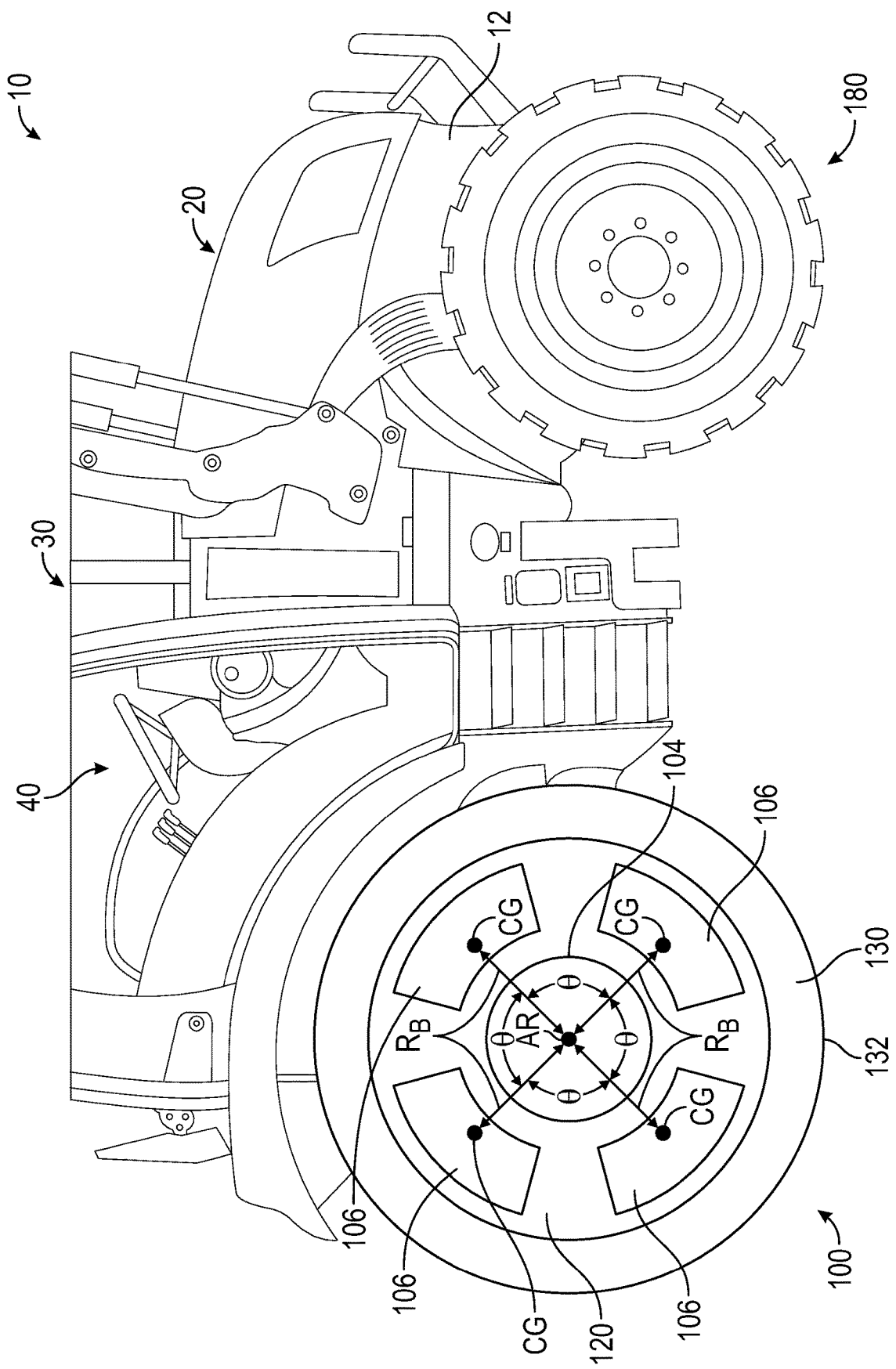
FIG. 6 is a right side view of the vehicle of FIG. 1 including two wheel assemblies, according to another exemplary embodiment.

Referring to FIG. 6, the vehicle 10 is shown in an alternative configuration including only two wheel assemblies 100. It should be understood that the vehicle of FIG. 5 and the vehicle 10 of FIG. 6 may be the same vehicle 10 but reconfigured with a different set of wheel assemblies 100 (i.e., FIGS. 5 and 6 may represent the same embodiment). The wheel assemblies 100 shown in FIG. 6 may be removed and replaced with the wheel assemblies 100 of FIG. 6. Accordingly, the vehicle 10 may be reconfigured with different wheel configurations based on the desired use of the vehicle 10 at the time.

In this embodiment, the vehicle 10 includes a pair of wheel assemblies 100 at the front end of the chassis 12. The vehicle 10 includes a pair of unpowered tractive elements or externally-powered tractive elements, shown as wheels 180, coupled to the front end of the chassis 12. Specifically, the wheels 180 may each be coupled to one of the wheel interfaces 16 in a similar manner to the wheel assemblies 100 (e.g., with bolts 154). In some embodiments, the wheels 180 include bearing members that permit free rotation of the wheels 180 relative to the chassis 12. In other embodiments, the wheel interfaces 16 are coupled to a transmission, clutch, or brake that selectively permits rotation of the wheel interfaces 16. By way of example, the wheel interfaces 16 may be fixed when coupled to the wheel assemblies 100 and rotatable when coupled to the wheels 180. In other embodiments, the vehicle 10 includes a primary driver (e.g., an internal combustion engine, an electric motor, etc.) that is coupled to the wheel interfaces 16 (e.g., through a transmission). By way of example, the wheel interfaces 16 may be fixed when coupled to the wheel assemblies 100 and driven by the primary driver when coupled to the wheels 180.

In the embodiment of FIG. 6, the wheel assemblies 100 each include four wheel batteries 106. As shown, the wheel batteries 106 have the same shape and size. The wheel batteries 106 may have similar densities, such that the wheel batteries 106 have the same weight and similarly-positioned centers of gravity CG. The wheel batteries 106 are arcuate to facilitate placement radially inward of the tire 130. In some embodiments, the radius of curvature of each wheel battery 106 is approximately centered about the axis of rotation AR.

As shown, the wheel batteries 106 are angularly offset from one another about the axis of rotation AR. The battery radii $R_B$ of each adjacent pair of wheel batteries 106 are angularly offset from one another by an offset angle ⊖. As shown, the offset angle ⊖ is approximately 90 degrees, such that the wheel batteries 106 are evenly spaced relative to one another. Accordingly, the wheel assembly 100 includes two pairs of wheel batteries 106 that are diametrically opposed from one another. By placing the wheel batteries 106 opposite one another, the overall center of gravity of all of the wheel batteries 106 is approximately centered about the axis of rotation AR. This placement minimizes vibration that would be caused by rotation of an eccentric center of gravity.

Figure 7:
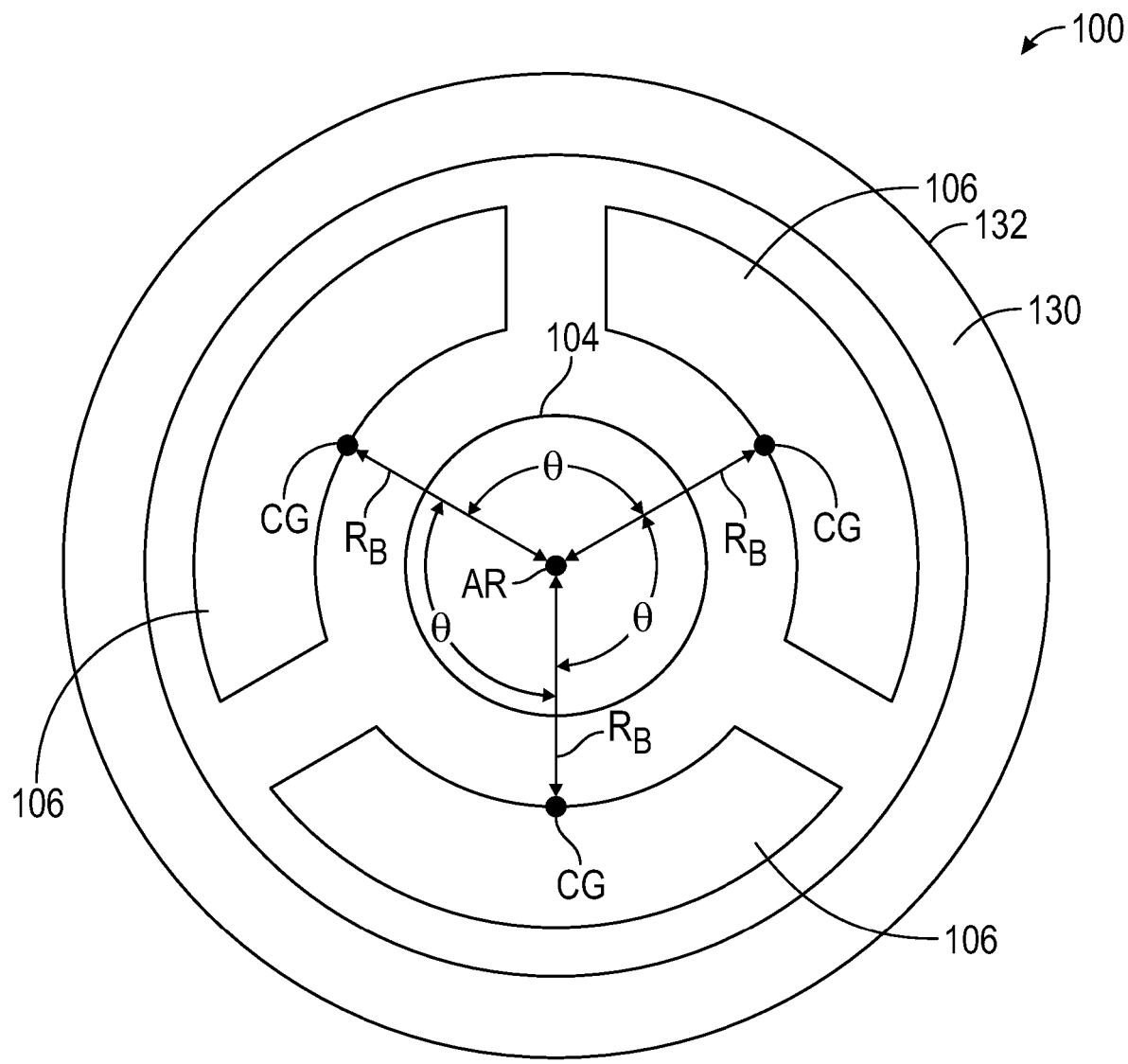
FIG. 7 is a right side view of a wheel assembly, according to another exemplary embodiment.

Referring to FIG. 7, an alternative embodiment of the wheel assembly 100 is shown. The wheel assembly 100 of FIG. 7 may be utilized with the vehicle 10. In the embodiment of FIG. 7, the wheel assembly 100 includes three wheel batteries 106. As shown, the wheel batteries 106 have the same shape and size. The wheel batteries 106 may have similar densities, such that the wheel batteries 106 have the same weight and similarly-positioned centers of gravity CG. The wheel batteries 106 are arcuate to facilitate placement radially inward of the tire 130. In some embodiments, the radius of curvature of each wheel battery 106 is approximately centered about the axis of rotation AR.

As shown, the wheel batteries 106 are angularly offset from one another about the axis of rotation AR. The battery radii $R_B$ of each adjacent pair of wheel batteries 106 are angularly offset from one another by an offset angle ⊖. As shown, the offset angle ⊖ is approximately 120 degrees, such that the wheel batteries 106 are evenly spaced relative to one another. The centers of gravity CG are spaced in an equilateral triangle that is centered about the axis of rotation AR. Accordingly, the overall center of gravity of all of the wheel batteries 106 is approximately centered about the axis of rotation AR. This placement minimizes vibration that would be caused by rotation of an eccentric center of gravity.

Control System

Figure 8:
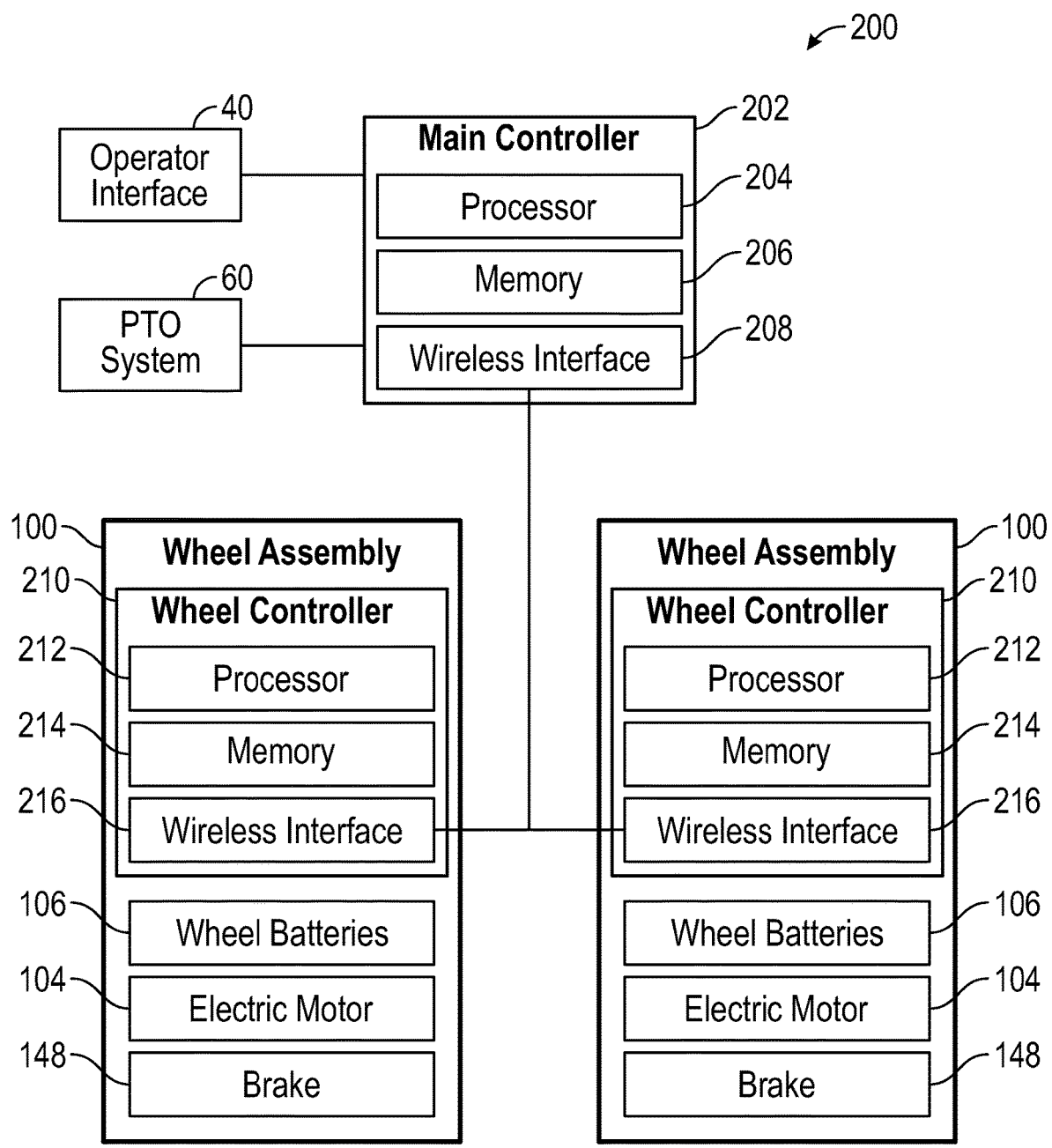
FIG. 8 is a block diagram of a control system of the vehicle of FIG. 1, according to an exemplary embodiment.

Referring to FIG. 8, the control system 200 is shown according to an exemplary embodiment. For ease of illustration, FIG. 8 illustrates two wheel assemblies 100 in communication with the control system 200. However, the control system 200 may communicate with more or fewer wheel assemblies 100, depending upon the configuration of the vehicle 10. By way of example, the control system 200 may communicate with all of the wheel assemblies 100 of the vehicle 10.

The control system 200 includes a processing circuit or central controller, shown as main controller 202, that controls the overall operation of the vehicle 10 (e.g., the driveline 50, etc.). The main controller 202 includes a processing device, shown as processor 204, and a memory device, shown as memory 206. The memory 206 may store one or more instructions that, when executed by the processor 204, cause the processor 204 to perform one or more of the processes described herein. The main controller 202 further includes a communication interface or network interface, shown as wireless interface 208. The wireless interface 208 permits the main controller to communicate wirelessly. The wireless interface 208 may utilize any type of wireless communication, such as Bluetooth, Wi-Fi, near-field communication, radio communication, infrared communication, or another type of wireless communication. The main controller 202 may additionally or alternatively utilize wired communication.

As shown, the main controller 202 is operatively coupled to the operator interface 40, the PTO system 60, and the wheel assemblies 100. The main controller 202 may receive information (e.g., commands, status information, etc.) from the operator interface 40, the PTO system 60, and/or the wheel assemblies 100. By way of example, the main controller 202 may receive an operator command to propel the vehicle 10 or run the PTO 64. The main controller 202 may provide information (e.g., commands) to the operator interface 40, the PTO system 60, and/or the wheel assemblies 100. By way of example, the main controller 202 may control operation of the electric motor 62 to drive the PTO 64.

Each of the wheel assemblies 100 includes a processing circuit, shown as wheel controller 210. The wheel controller 210 includes a processing device, shown as processor 212, and a memory device, shown as memory 214. The memory 214 may store one or more instructions that, when executed by the processor 212, cause the processor 212 to perform one or more of the processes described herein. The wheel controller 210 further includes a communication interface or network interface, shown as wireless interface 216. The wireless interface 216 permits the main controller to communicate wirelessly. The wireless interface 216 facilitates wireless communication between (a) the wheel controller 210 and (b) the main controller 202 and/or another wheel controller 210. By way of example, a wheel controller 210 may communicate directly with the main controller 202. By way of another example, the wheel controllers 210 may form a mesh network, such that the wheel controllers 210 communicate indirectly with the main controller 202 through one another. The wheel controller 210 may additionally or alternatively utilize wired communication.

As shown, the wheel controller 210 is operatively coupled to the wheel batteries 106, the electric motor 104, and the brake 148 of the corresponding wheel assembly 100. The wheel controller 210 may control operation of the corresponding wheel assembly 100 (e.g., in response to receiving a command from an external source, such as the main controller 202). By way of example, the wheel controller 210 may vary the flow of electrical energy from the wheel batteries 106 to the electric motor 104 to vary or otherwise control the speed and/or direction of the rotation of the electric motor 104. By way of another example, the wheel controller 210 may engage or disengage the brake 148. Alternatively, the brakes 148 may be mechanically actuated. By way of example, the brakes 148 may be activated by supplying pressurized brake fluid in response to an operator pressing a brake pedal.

The main controller 202 may be positioned on or otherwise coupled to the chassis 12 (e.g., directly coupled to the chassis 12, coupled to the body 20 or the cab 30, etc.), such that the main controller 202 does not rotate with the wheel assemblies 100. Each wheel controller 210 may be positioned on or otherwise coupled to the corresponding wheel assembly 100. By way of example, the wheel controller 210 may be coupled to the rim 120 of the corresponding wheel assembly 100. Accordingly, the wheel controllers 210 may rotate with the corresponding wheels 102.

By placing the wheel controllers 210 on the wheels, the wheel controllers 210 may be electrically coupled to the corresponding wheel batteries 106 and electric motor 104 without having to manage wiring that would otherwise rotate if the electric motor 104 was directly coupled to a controller coupled to the chassis 12 (e.g., the main controller 202). Instead, the main controller 202 wirelessly communicates with each of the wheel controllers 210 to control propulsion of the vehicle 10. By way of example, the operator interface 40 may receive a command from the operator to drive forward. In response, the main controller 202 may wirelessly provide commands to each of the wheel controllers 210 indicating that the corresponding wheel assembly 100 should drive forward. Each wheel controller 210 may then cause the corresponding electric motor 104 to drive the wheel 102 in the direction indicated by the main controller 202.

Because the wheels 102 are each independently driven by a different electric motor 104, the relative speeds of the wheels 102 may be varied to facilitate steering or otherwise turning the vehicle 10 (e.g., using a skid steer turning strategy). By way of example, the main controller 202 may command the wheels 102 on the right side of the vehicle 10 to drive more slowly than the wheels 102 on the left side of the vehicle 10, causing the vehicle 10 to turn to the right. By way of another example, the main controller 202 may command the wheels 102 on the right side of the vehicle 10 to drive in reverse while commanding the wheels 102 on the left side of the vehicle to drive forward, causing the vehicle 10 to turn in place in a rightward direction.

In an alternative embodiment, the wheel controllers 210 are omitted, and the main controller 202 is in direct wired communication with the electric motors 104. In such embodiments, the wheel controllers 210 may be communicably coupled to the electric motors 104 through slip rings to permit rotation of the wheels 102 and the electric motors 104 relative to the chassis. 12.

Wheel Assembly Retrofit Kit

In some embodiments, one or more wheel assemblies 100 are provided as a retrofit kit for an existing vehicle. By way of example, the wheel assemblies 100 may be utilized to convert an internal combustion engine vehicle to a hybrid or purely electric vehicle. In such embodiments, the wheel interfaces 16 may be wheel hubs that were previously coupled to unpowered wheels. One or more of the unpowered wheels may be removed, and the wheel assemblies 100 may be coupled to the hubs. A transmission of the vehicle may be reconfigured into a locked or park configuration in which the hubs are fixed relative to the chassis of the vehicle, and the electric motors 104 may apply a torque against the stationary hubs to drive the wheels.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the PTO system 60, the control system 200, etc.) as shown in the various exemplary embodiments is illustrative only. Additionally, any element disclosed in one embodiment may be incorporated or utilized with any other embodiment disclosed herein.

What is claimed is:

1. A vehicle, comprising:
a chassis;
a tractive assembly coupled to the chassis, the tractive assembly including a rim and a tractive element coupled to the rim, the tractive element configured to engage a support surface;
a battery directly coupled to the tractive assembly; and
an electric motor coupled to the tractive assembly and configured to receive electrical energy from the battery and drive movement of the tractive assembly relative to the chassis to propel the vehicle,
wherein the tractive assembly rotates relative to the chassis about an axis of rotation, and wherein the battery is fixedly coupled to the tractive assembly such that the battery rotates with the tractive assembly about the axis of rotation.

2. The vehicle of claim 1, wherein the tractive assembly is a wheel,
wherein the tractive element is a tire that defines an outer perimeter of the wheel that engages the support surface as the tire rotates,
wherein the outer perimeter surrounds a wheel volume, and
wherein the battery extends within the wheel volume.

3. The vehicle of claim 2, wherein the electric motor extends at least partially within the wheel volume.

4. The vehicle of claim 2, wherein the battery is a first battery, further comprising a second battery directly coupled to the wheel and electrically coupled to the electric motor, wherein the wheel rotates about an axis of rotation, and wherein the first battery is angularly offset from the second battery about the axis of rotation.

5. The vehicle of claim 4, wherein the first battery is angularly offset from the second battery by approximately 180 degrees.

6. The vehicle of claim 4, further comprising a third battery directly and removably coupled to the wheel, wherein the third battery can be removed from the wheel without removing the first battery from the wheel.

7. The vehicle of claim 1, wherein the tractive assembly is a wheel that rotates relative to the chassis about an axis of rotation, and wherein the battery is rotatably coupled to the wheel such that the battery moves relative to the wheel as the wheel rotates.

8. The vehicle of claim 1, wherein the tractive assembly is a wheel that rotates about an axis of rotation when driven by the electric motor, and wherein the electric motor is aligned with the axis of rotation.

9. The vehicle of claim 8, wherein the electric motor includes a first portion that is fixedly coupled to the wheel and a second portion that is fixedly coupled to the chassis.

10. The vehicle of claim 9, wherein the first portion of the electric motor is a stator that is electrically coupled to the battery, and wherein the second portion of the electric motor is a rotor.

11. The vehicle of claim 9, wherein the chassis includes a frame and a wheel interface coupled to the frame, further comprising a cab coupled to the frame, wherein the wheel, the battery, and the electric motor are removably coupled to the wheel interface, and wherein the wheel interface remains stationary relative to the frame while the electric motor drives the wheel.

12. The vehicle of claim 1, further comprising a driver and a power take off (PTO) coupled to the chassis, wherein the driver is configured to drive the PTO.

13. The vehicle of claim 12, wherein the electric motor is a first electric motor and the battery is a first battery, wherein the driver is a second electric motor, further comprising a second battery coupled to the chassis and configured to supply electrical energy to the second electric motor to drive rotation of the PTO.

14. The vehicle of claim 1, further comprising:
a user interface;
a first controller coupled to the chassis and operatively coupled to the user interface; and
a second controller coupled to the tractive assembly, operatively coupled to the electric motor, and in wireless communication with the first controller,
wherein the second controller is configured to control the electric motor to drive the tractive assembly in response to a user input being received by the user interface.

15. A wheel assembly, comprising:
an interface configured to be coupled to a chassis of a vehicle;
a wheel rotatably coupled to the interface wherein the wheel includes a rim and a tire, the tire including a tread that is configured to engage a support surface;
an electric motor coupled to the wheel and the interface and configured to rotate the wheel relative to the interface about an axis of rotation; and
a battery removably coupled to the wheel and electrically coupled to the electric motor, wherein the battery is removably coupled to the rim between the tread and the electric motor.

16. The wheel assembly of claim 15, further comprising a controller coupled to the rim and configured to control operation of the electric motor, wherein the controller is configured to wirelessly receive commands from an external source.

17. A vehicle, comprising:
a chassis;
a first wheel assembly coupled to the chassis, the first wheel assembly including:
a first wheel;
a first electric motor coupled to the first wheel and configured to drive rotation of the first wheel relative to the chassis, wherein the first electric motor includes a first portion that is fixedly coupled to the first wheel and a second portion that is fixedly coupled to the chassis;
a first battery coupled to the first wheel and electrically coupled to the first electric motor; and
a first wheel controller operatively coupled to the first electric motor;
a second wheel assembly coupled to the chassis, the second wheel assembly including:
a second wheel;
a second electric motor coupled to the second wheel and configured to drive rotation of the second wheel relative to the chassis, wherein the second electric motor includes a third portion that is fixedly coupled to the second wheel and a fourth portion that is fixedly coupled to the chassis;
a second battery coupled to the second wheel and electrically coupled to the second electric motor; and
a second wheel controller operatively coupled to the second electric motor;

an operator interface coupled to the chassis; and
a central controller operatively coupled to the operator interface and in wireless communication with the first wheel controller and the second wheel controller, wherein the central controller is configured to command the first wheel controller and the second wheel controller in response to the operator interface receiving an input requesting movement of the vehicle.

* * * * *